US012397791B2

(12) United States Patent
Higuchi et al.

(10) Patent No.: US 12,397,791 B2
(45) Date of Patent: Aug. 26, 2025

(54) DISPLAYING CONTROL APPARATUS

(71) Applicant: TOYOTA JIDOSHA KABUSHIKI KAISHA, Toyota (JP)

(72) Inventors: Sawa Higuchi, Toyota (JP); Hideki Kamatani, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 18/539,990

(22) Filed: Dec. 14, 2023

(65) Prior Publication Data

US 2024/0199055 A1 Jun. 20, 2024

(30) Foreign Application Priority Data

Dec. 16, 2022 (JP) .................. 2022-201092

(51) Int. Cl.
*B60W 30/18* (2012.01)
*B60K 35/00* (2024.01)
*B60W 30/16* (2020.01)
*B60W 50/14* (2020.01)

(52) U.S. Cl.
CPC ....... *B60W 30/18072* (2013.01); *B60K 35/00* (2013.01); *B60W 30/16* (2013.01); *B60W 50/14* (2013.01); *B60W 2030/18081* (2013.01); *B60W 2030/1809* (2013.01); *B60W 2050/146* (2013.01); *B60W 2520/10* (2013.01); *B60W 2720/10* (2013.01); *B60W 2754/10* (2020.02)

(58) Field of Classification Search
None
See application file for complete search history.

(56) References Cited

U.S. PATENT DOCUMENTS

| 8,024,102 B2 * | 9/2011 | Swoboda ........... B60K 31/0008 340/436 |
| 8,355,851 B2 | 1/2013 | Inoue et al. |
| 8,370,040 B2 | 2/2013 | Inoue et al. |
| 8,417,430 B2 | 4/2013 | Saeki |

(Continued)

FOREIGN PATENT DOCUMENTS

| AU | 2013223220 A1 * | 8/2014 | ............... G08G 1/20 |
| AU | 2013223220 B2 * | 4/2016 | ...... B60W 30/18072 |

(Continued)

*Primary Examiner* — Kevin R Steckbauer
(74) *Attorney, Agent, or Firm* — Sughrue Mion, PLLC

(57) ABSTRACT

A displaying control apparatus displays an image which represents a predetermined speed range by a displaying device of an own vehicle while executing a moving speed control, or displays an image which represents a predetermined distance range by the displaying device while executing an inter-vehicle distance control. While executing the moving speed control, the displaying control apparatus display the image representing the predetermined speed range such that the own vehicle or an image representing the own vehicle is displayed within the image representing the predetermined speed range. While executing the inter-vehicle distance control, the displaying control apparatus displays the image representing the predetermined distance range such that the own vehicle or the image representing the own vehicle is displayed within the image representing the predetermined distance range.

2 Claims, 9 Drawing Sheets

(56) References Cited

U.S. PATENT DOCUMENTS

| | | | | |
|---|---|---|---|---|
| 8,521,394 | B2* | 8/2013 | Tsumori | B60W 20/10 |
| | | | | 701/123 |
| 8,548,709 | B2 | 10/2013 | Morita | |
| 8,768,597 | B2 | 7/2014 | Kagawa | |
| 8,825,339 | B2* | 9/2014 | Shono | B60K 31/00 |
| | | | | 701/96 |
| 8,983,750 | B2* | 3/2015 | Maruyama | B60W 30/143 |
| | | | | 701/93 |
| 9,174,643 | B2 | 11/2015 | Aso | |
| 9,418,557 | B2* | 8/2016 | Kawamata | G07C 5/02 |
| 10,017,178 | B2 | 7/2018 | Morimoto et al. | |
| 10,118,617 | B2 | 11/2018 | Urano et al. | |
| 10,486,698 | B2 | 11/2019 | Masui et al. | |
| 10,994,724 | B2* | 5/2021 | Matsumura | B60W 40/08 |
| 11,565,694 | B2* | 1/2023 | Eo | B60W 10/06 |
| 12,280,664 | B2* | 4/2025 | Sung | B60K 35/22 |
| 2010/0250046 | A1 | 9/2010 | Miura | B60W 40/09 |
| | | | | 701/31.4 |
| 2010/0253496 | A1* | 10/2010 | Nishikawa | G01D 7/00 |
| | | | | 340/459 |
| 2010/0324795 | A1* | 12/2010 | Tsumori | B60W 10/08 |
| | | | | 701/70 |
| 2012/0253628 | A1* | 10/2012 | Maruyama | B60W 50/085 |
| | | | | 701/93 |
| 2012/0253629 | A1* | 10/2012 | Maruyama | B60W 30/16 |
| | | | | 701/96 |
| 2013/0211686 | A1* | 8/2013 | Shono | G06F 17/00 |
| | | | | 701/70 |
| 2016/0019792 | A1* | 1/2016 | Kawamata | G07C 5/085 |
| | | | | 701/70 |
| 2017/0297566 | A1* | 10/2017 | Matsumura | B60W 40/08 |
| 2019/0187883 | A1* | 6/2019 | Lee | G02B 27/0101 |
| 2019/0202341 | A1* | 7/2019 | Rikimaru | B60Q 1/50 |
| 2019/0295419 | A1 | 9/2019 | Tosa et al. | |
| 2020/0361461 | A1* | 11/2020 | Eo | B60K 6/387 |
| 2021/0221362 | A1* | 7/2021 | Matsumura | B60W 30/143 |
| 2021/0323569 | A1* | 10/2021 | Yamaoka | B60W 50/0097 |
| 2022/0080828 | A1* | 3/2022 | Sung | B60K 35/10 |
| 2023/0154322 | A1* | 5/2023 | Kamakura | D21D 1/38 |
| | | | | 701/119 |
| 2023/0234587 | A1* | 7/2023 | Ito | B60W 50/0097 |
| | | | | 701/96 |
| 2024/0101114 | A1* | 3/2024 | Jing | B60W 30/182 |
| 2024/0101121 | A1* | 3/2024 | Jing | B60W 50/0097 |
| 2024/0132069 | A1* | 4/2024 | Kamatani | B60W 30/18072 |
| 2024/0132072 | A1* | 4/2024 | Kamatani | B60W 30/18072 |
| 2024/0199055 | A1* | 6/2024 | Higuchi | B60W 30/18072 |
| 2024/0227801 | A9* | 7/2024 | Kamatani | B60W 30/16 |
| 2024/0227806 | A9* | 7/2024 | Kamatani | B60W 30/18072 |
| 2024/0239339 | A1* | 7/2024 | Kamatani | B60W 30/143 |

FOREIGN PATENT DOCUMENTS

| | | | | | |
|---|---|---|---|---|---|
| CN | 102596675 | A | * | 7/2012 | B60W 30/16 |
| CN | 103153745 | A | * | 6/2013 | B60K 6/445 |
| CN | 103153745 | B | * | 4/2015 | B60K 6/445 |
| CN | 102596675 | B | * | 5/2015 | B60W 30/18072 |
| CN | 107804320 | A | * | 3/2018 | B60W 50/082 |
| CN | 112572400 | A | * | 3/2021 | B60W 10/06 |
| CN | 113353006 | A | * | 9/2021 | B60R 16/023 |
| CN | 113370986 | A | * | 9/2021 | B60W 50/06 |
| CN | 108162951 | B | * | 7/2022 | B60L 15/2045 |
| CN | 118205391 | A | * | 6/2024 | B60K 35/00 |
| CN | 113370986 | B | * | 2/2025 | B60W 50/06 |
| CN | 119773495 | A | * | 4/2025 | B60W 40/04 |
| CN | 120003472 | A | * | 5/2025 | B60W 50/06 |
| DE | 102012102708 | A1 | * | 10/2012 | B60K 35/00 |
| DE | 102019003431 | A1 | * | 11/2020 | B60W 60/0015 |
| DE | 102017126427 | B4 | * | 8/2022 | B60W 30/182 |
| EP | 4219260 | A1 | * | 8/2023 | B60W 30/16 |
| FR | 3017586 | A1 | * | 8/2015 | B60W 30/143 |
| JP | 2001063401 | A | * | 3/2001 | B60K 35/00 |
| JP | 2001199262 | A | * | 7/2001 | |
| JP | 3755248 | B2 | | 3/2006 | |
| JP | 4066609 | B2 | * | 3/2008 | B60K 31/185 |
| JP | 4078907 | B2 | * | 4/2008 | |
| JP | 2017190047 | A | * | 10/2017 | B60W 10/06 |
| JP | 2019196082 | A | * | 11/2019 | B60W 30/16 |
| JP | 7043965 | B2 | * | 3/2022 | B60W 30/143 |
| JP | 2024086127 | A | * | 6/2024 | B60K 35/00 |
| JP | 2024103372 | A | * | 8/2024 | G08G 1/052 |
| KR | 20160099261 | A | * | 8/2016 | B60K 35/00 |
| KR | 101673747 | B1 | * | 11/2016 | B60K 37/02 |
| KR | 20180132922 | A | * | 12/2018 | B60W 40/08 |
| KR | 20220036455 | A | * | 3/2022 | B60K 35/22 |
| KR | 20220083675 | A | * | 6/2022 | H04N 7/181 |
| KR | 20220135900 | A | * | 10/2022 | G02B 27/01 |
| WO | WO-2009101920 | A1 | * | 8/2009 | B60W 10/115 |
| WO | WO-2013125538 | A1 | * | 8/2013 | B60W 30/18072 |
| WO | WO-2016009628 | A1 | * | 1/2016 | B60K 35/28 |
| WO | WO-2024127922 | A1 | * | 6/2024 | B60K 35/21 |
| WO | WO-2025074781 | A1 | * | 4/2025 | B60W 50/14 |

* cited by examiner

DISPLAYING CONTROL APPARATUS

CROSS-REFERENCE TO RELATED APPLICATIONS

This application claims priority to Japanese patent application No. JP 2022-201092 filed on Dec. 16, 2022, the content of which is hereby incorporated by reference in its entirety.

BACKGROUND

Field

The present invention relates to a displaying control apparatus.

Description of the Related Art

There is known a vehicle control apparatus which executes a moving speed control of autonomously accelerating or decelerating an own vehicle so as to maintain a moving speed of the own vehicle at a predetermined speed or an inter-vehicle control of autonomously accelerating or decelerating the own vehicle so as to maintain an inter-vehicle distance (i.e., a distance between the own vehicle and a preceding vehicle) at a predetermined distance. Also, there is known a displaying control apparatus which executes a displaying process to inform a driver of the own vehicle of a controlled state of the moving speed of the own vehicle by the moving speed control or the inter-vehicle distance by the inter-vehicle distance control (for example, refer to JP 3755248 B).

Also, there is known a vehicle control apparatus which execute a moving speed control of autonomously accelerating or decelerating the own vehicle so as to maintain the moving speed of the own vehicle at a speed within a certain range or an inter-vehicle distance control of autonomously accelerating or decelerating the own vehicle so as to maintain the inter-vehicle distance at a distance within a certain range. While the moving speed control or the inter-vehicle distance control is being executed, the moving speed of the own vehicle or the inter-vehicle distance changes considerably within the certain range. As a result, the driver of the own vehicle may erroneously understand that the moving speed of the own vehicle or the inter-vehicle distance is not normally controlled.

SUMMARY

An object of the present invention is to provide a displaying control apparatus which can prevent the operator of the own vehicle from erroneously understanding that the moving speed of the own vehicle or the inter-vehicle distance is not normally controlled while the moving speed control or the inter-vehicle distance control is being executed.

A displaying control apparatus according to the present invention, comprises an electronic control unit. The electronic control unit is configured to display an image which represents a predetermined speed range by a displaying device of an own vehicle while the electronic control unit is executing a moving speed control. The moving speed control corresponds to a control of (i) executing a coasting control of causing the own vehicle to coast when a moving speed of the own vehicle increases and reaches an upper limit value of the predetermined speed range, and (ii) executing an acceleration control of accelerating the own vehicle when the moving speed of the own vehicle decreases and reaches a lower limit value of the predetermined speed range. Alternatively the electronic control unit is configured to display an image which represents a predetermined distance range by the displaying device while the electronic control unit is executing an inter-vehicle distance control. The inter-vehicle distance control corresponds to a control of (i) executing the coasting control when an inter-vehicle distance between the own vehicle and a surrounding vehicle decreases and reaches a lower limit value of the predetermined distance range, and (ii) executing the acceleration control when the inter-vehicle distance increases and reaches an upper limit value of the predetermined distance range. The surrounding vehicle corresponding to a vehicle around the own vehicle and moving in the same direction in which the own vehicle moves. The electronic control unit is configured to while the electronic control unit is executing the moving speed control, display the image representing the predetermined speed range such that the own vehicle or an image representing the own vehicle is displayed within the image representing the predetermined speed range, and while the electronic control unit is executing the inter-vehicle distance control, display the image representing the predetermined distance range such that the own vehicle or the image representing the own vehicle is displayed within the image representing the predetermined distance range.

While the moving speed control is being executed, the moving speed of the own vehicle increases or decreases considerably. In addition, while the inter-vehicle distance control is being executed, the inter-vehicle distance increases or decreases considerably. When the moving speed of the own vehicle or the inter-vehicle distance increases or decreases considerably, an operator of the own vehicle may erroneously understand that the moving speed of the own vehicle or the inter-vehicle distance is not normally controlled.

With the displaying control apparatus according to the present invention, the predetermine speed range corresponding to a control target in the moving speed control is displayed such that the own vehicle or the image representing the own vehicle is within the image representing the predetermined speed range. In addition, with the displaying control apparatus according to the present invention, the predetermine distance range corresponding to a control target in the inter-vehicle distance control is displayed such that the own vehicle or the image representing the own vehicle is within the image representing the predetermined distance range. Thus, the operator of the own vehicle can easily understand that the moving speed of the own vehicle or the inter-vehicle distance is controlled within a range having a certain width. Therefore, the displaying control apparatus can prevent the operator of the own vehicle from erroneously understanding that the moving speed of the own vehicle or the inter-vehicle distance is not normally controlled.

In the displaying control apparatus according to an aspect of the present invention, the electronic control unit may be configured to when the electronic control unit changes a width of the predetermined speed range, change a length of the image representing the predetermined speed range depending on the changed width of the predetermined speed range, and when the electronic control unit changes a width of the predetermined distance range, change a length of the image representing the predetermined distance range depending on the changed width of the predetermined distance range.

When the width of the image representing the predetermined speed range depends on the width of the predetermined speed range, the operator of the own vehicle can easily recognize the width of the predetermined speed range. Similarly, when the width of the image representing the predetermined distance range depends on the width of the predetermined distance range, the operator of the own vehicle can easily recognize the width of the predetermined distance range.

With the displaying control apparatus according to this aspect of the present invention, when the width of the predetermined speed range is changed, the width of the image representing the predetermined speed range is changed depending on the changed width of the predetermined speed range. With the displaying control apparatus according to this aspect of the present invention, when the width of the predetermined distance range is changed, the width of the image representing the predetermined distance range is changed depending on the changed width of the predetermined distance range. Thus, the displaying control apparatus can cause the operator of the own vehicle to easily recognize the predetermined speed range or the predetermined distance range.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
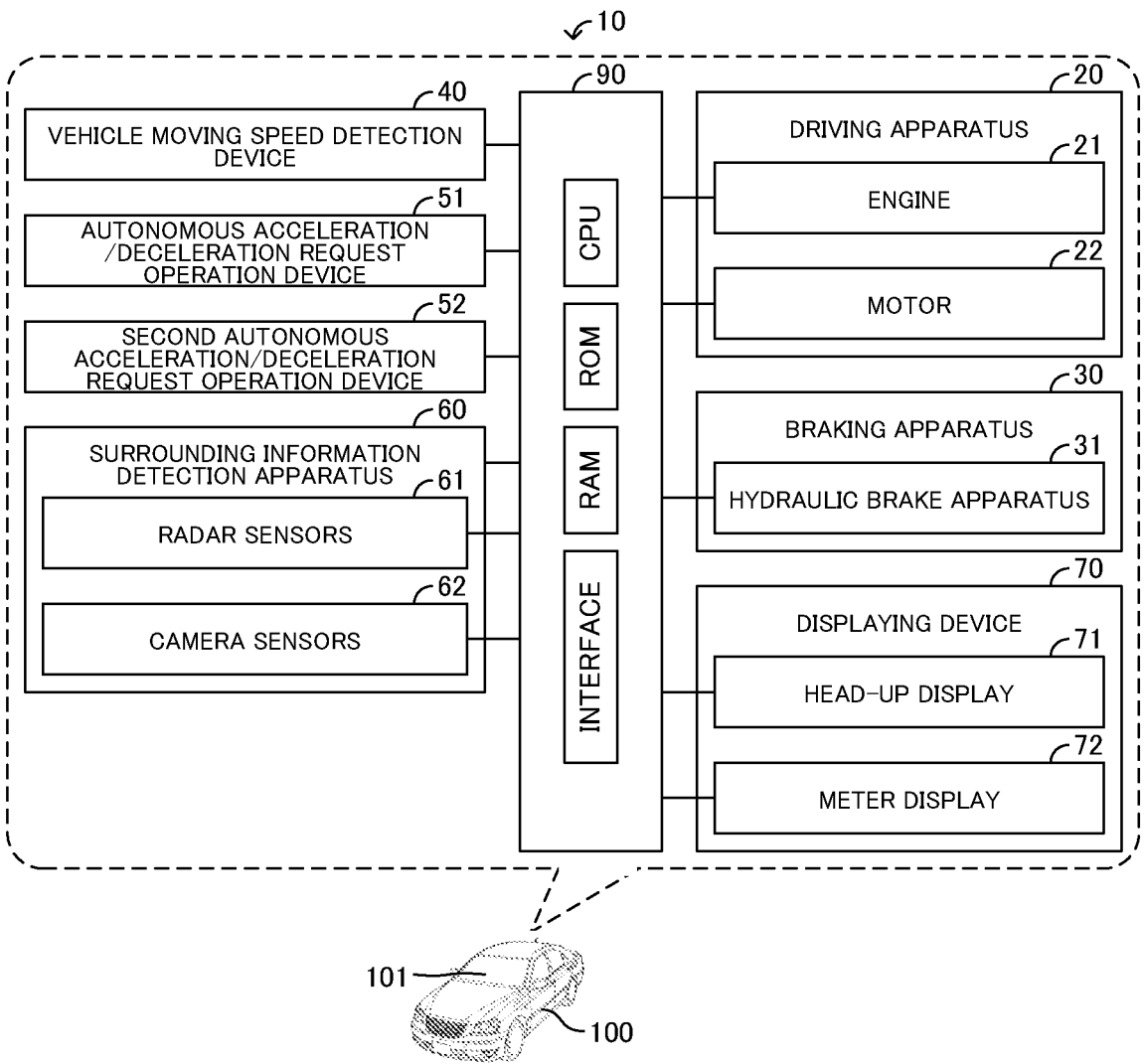
FIG. 1 is a view which shows a vehicle control apparatus including a displaying control apparatus according to an embodiment of the present invention.

Below, a displaying control apparatus according to an embodiment of the present invention will be described with reference to the drawings. FIG. 1 shows a vehicle control apparatus 10. The vehicle control apparatus 10 is mounted on an own vehicle 100. Hereinafter, the vehicle control apparatus 10 will be described by exemplifying that an operator of the own vehicle 100 is a person who is in the own vehicle 100 and directly drives the own vehicle 100, that is, a driver of the own vehicle 100.

However, the operator of the own vehicle 100 may be a remote operator of the own vehicle 100, i.e., an operator who is not in the own vehicle 100 and remotely drives the own vehicle 100. When the operator of the own vehicle 100 is the remote operator, the vehicle control apparatus 10 is mounted on the own vehicle 100 and a remote operation facility installed outside the own vehicle 100 for remotely driving the own vehicle 100. In this case, functions realized by the vehicle control apparatus 10 described below are realized by the vehicle control apparatus 10 mounted on the own vehicle 100 and the vehicle control apparatus 10 mounted on the remote operation facility.

The vehicle control apparatus 10 includes an ECU (an electronic control device) 90 as a control unit. The ECU 90 includes a microcomputer as a main component. The microcomputer includes a CPU, a ROM, a RAM, a non-volatile memory, and an interface. The CPU implements various functions by executing instructions, programs, or routines stored in the ROM. In the present embodiment, the vehicle control apparatus 10 includes one ECU. In this regard, as will be described later, the vehicle control apparatus 10 may include a plurality of the ECUs and execute various processes described later by the ECUs.

The vehicle control apparatus 10 executes an autonomous acceleration/deceleration control as an autonomous driving control or an automatic driving control. The autonomous acceleration/deceleration control corresponds to a control of causing the own vehicle 100 to move by autonomously controlling operations of the driving apparatus 20 and the braking apparatus 30 to accelerate or the own vehicle 100. In the present embodiment, the autonomous acceleration/deceleration control includes an inter-vehicle distance control and a moving speed control. Further, in the present embodiment, the driving apparatus 20 includes an internal combustion engine 21 and an electric motor 22, and the braking apparatus 30 includes a hydraulic brake apparatus 31.

Figure 2A:
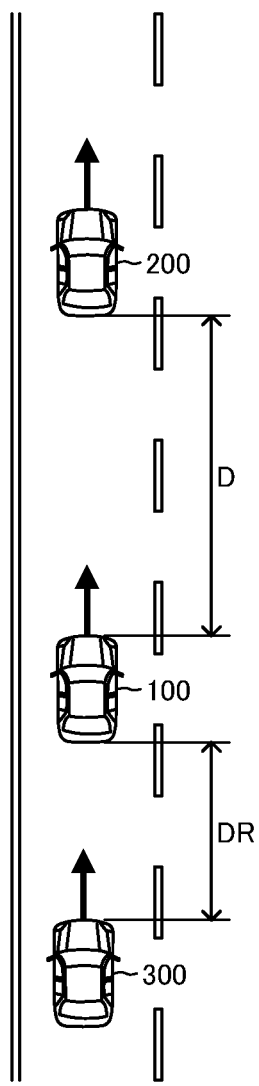
FIG. 2A is a view which shows a scene that a preceding vehicle exists.

The inter-vehicle distance control corresponds to a control which is executed when a preceding vehicle 200 exists in front of the own vehicle 100 as shown in FIG. 2A. The inter-vehicle distance control corresponds to a control of autonomously accelerating or decelerating the own vehicle 100 based on a target distance Dtgt. The preceding vehicle 200 is another vehicle which moves in front of the own vehicle 100 and moves within a predetermined distance from the own vehicle 100. The vehicle control apparatus 10 detects the preceding vehicle 200 based on surrounding detection information IS described later. The target distance Dtgt corresponds to an inter-vehicle distance D which is set by the driver as a control target used by the inter-vehicle distance control. The inter-vehicle distance D corresponds to a distance between the own vehicle 100 and the preceding vehicle 200. The vehicle control apparatus 10 acquires the inter-vehicle distance D based on the surrounding detection information IS described later.

Figure 2B:
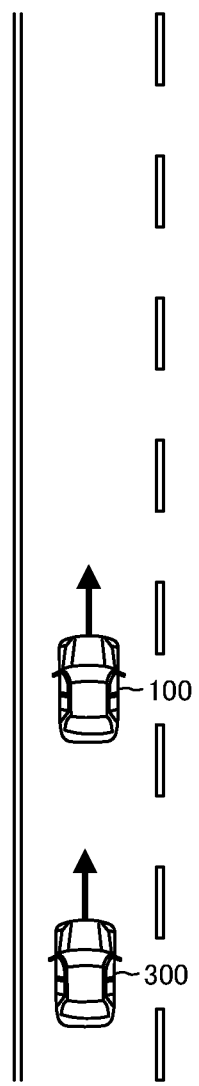
FIG. 2B is a view which shows a scene that the preceding vehicle does not exist.

On the other hand, the moving speed control corresponds to a control which is executed when the preceding vehicle 200 does not exist in front of the own vehicle 100 as shown in FIG. 2B. The moving speed control corresponds to a control of autonomously accelerating or decelerating the own vehicle 100 based on a set speed Vset (or a target speed). The set speed Vset corresponds to an own vehicle speed V (i.e., a moving speed of the own vehicle 100) set by the driver as a control target by the moving speed control. The vehicle control apparatus 10 acquires the own vehicle speed V by an own vehicle speed detection device 40.

Next, operations of the vehicle control apparatus 10 will be described. The vehicle control apparatus 10 executes a routine shown in FIG. 3 at a predetermined calculation cycle to execute the autonomous acceleration/deceleration control and a displaying control of causing a displaying device 70 to display information on control status of the own vehicle speed V or the inter-vehicle distance D by the autonomous acceleration/deceleration control.

Figure 4A:
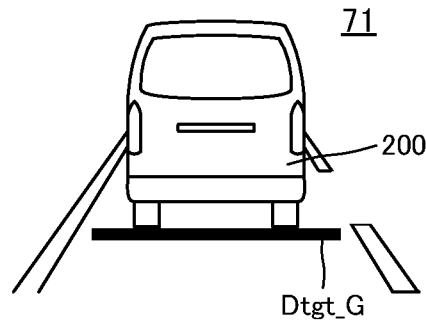
FIG. 4A is a view which shows an image displayed by a head-up display while a first inter-vehicle distance control is being executed.

In the present example, the displaying device 70 includes a head-up display 71 and a meter display 72. The head-up display 71 is a device which projects various images onto a windshield 101 of the own vehicle 100 to provide various types of information to the driver of the own vehicle 100 (refer to FIG. 4A). The meter display 72 is a device which is disposed in front of a driver's seat of the own vehicle 100, and is configured to display various images to provide various types of information to the driver of the own vehicle 100 (refer to FIG. 4B). In the present embodiment, the meter display 72 displays a speedometer 721 and a speed indicator 722 when the meter display is activated. The speed indicator 722 indicates the current moving speed of the own vehicle 100 and is displayed at a position of the speedometer 721 corresponding to the current moving speed of the own vehicle 100.

Figure 3:
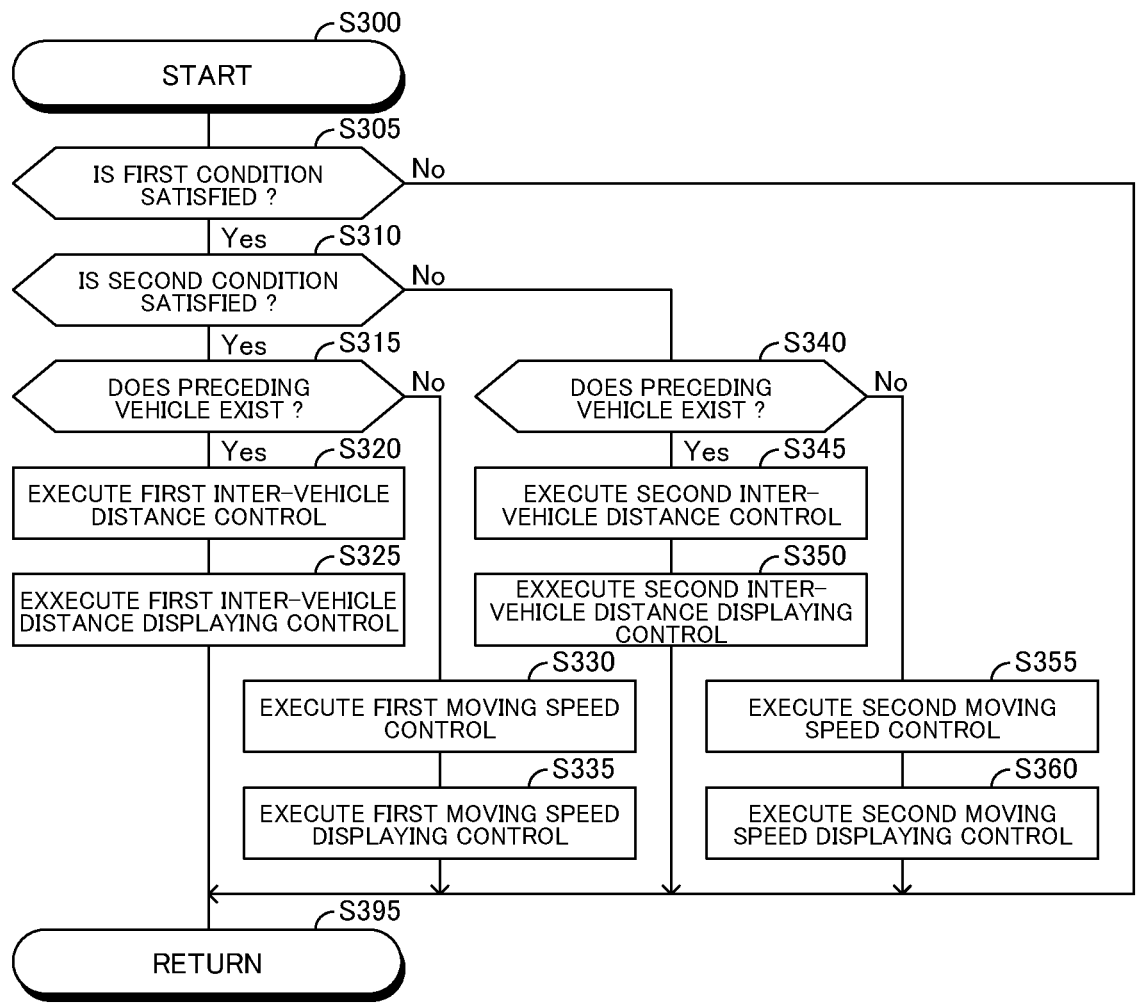
FIG. 3 is a flowchart of a routine executed by the vehicle control apparatus according to the embodiment of the present invention.

At a predetermined timing, the vehicle control apparatus 10 starts to execute a process from a step S300 of the routine shown in FIG. 3 and proceeds with the process to a step S305 to determine whether a first condition C1 is satisfied. The first condition C1 corresponds to a condition that an execution of the autonomous acceleration/deceleration control is requested. The driver can request the vehicle control apparatus 10 to execute the autonomous acceleration/deceleration control by operating an autonomous acceleration/deceleration request operation device 51 such as a moving assistance button.

When the vehicle control apparatus 10 determines "Yes" at the step S305, the vehicle control apparatus 10 proceeds with the process to a step S310 to determine whether a second condition C2 is satisfied. The second condition C2 corresponds to a condition that an execution of a second autonomous acceleration/deceleration control (or an economy moving control) is not requested. The driver can request the vehicle control apparatus 10 to execute the second autonomous acceleration/deceleration control by operating a second autonomous acceleration/deceleration request operation device 52 such as an economy moving button. Further, in the present embodiment, the second autonomous acceleration/deceleration control includes a second inter-vehicle distance control and a second moving speed control described later.

When the vehicle control apparatus 10 determines "Yes" at the step S310, the vehicle control apparatus 10 proceeds with the process to a step S315 to determine whether the preceding vehicle 200 exists. The vehicle control apparatus 10 determines whether the preceding vehicle 200 exists based on the surrounding detection information IS.

The surrounding detection information IS information which is provided from a surrounding information detection apparatus 60 mounted on the own vehicle 100. In the present embodiment, the surrounding information detection apparatus 60 includes radar sensors 61 and camera sensors 62. The surrounding information detection apparatus 60 provides radar detection information (i.e., information on a situation around the own vehicle 100 acquired by the radar sensor 61) to the vehicle control apparatus 10 as the surrounding detection information IS. In addition, the surrounding information detection apparatus 60 provides image information (image data of the situation around the own vehicle 100 acquired by the camera sensor 62) to the vehicle control apparatus 10 as the surrounding detection information IS.

When the vehicle control apparatus 10 determines "Yes" at the step S315, the vehicle control apparatus 10 proceeds with the process to a step S320 to execute a first inter-vehicle distance control as the autonomous acceleration/deceleration control. The first inter-vehicle distance control corresponds to a first autonomous acceleration/deceleration control. The first inter-vehicle distance control corresponds to a control of autonomously controlling acceleration and deceleration of the own vehicle 100 so as to maintain the inter-vehicle distance D at the target distance Dtgt. Therefore, the first inter-vehicle distance control corresponds to a so-called following moving control or an adaptive cruise control.

Next, the vehicle control apparatus 10 proceeds with the process to a step S325 to execute a first inter-vehicle distance displaying control. Then, the vehicle control apparatus 10 proceeds with the process to a step S395 to terminate executing the process of this routine once.

Figure 4B:
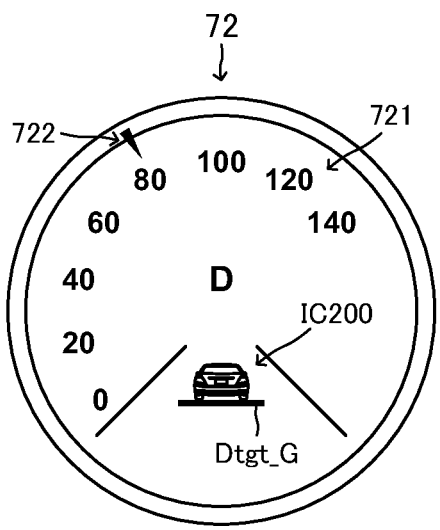
FIG. 4B is a view which shows an image displayed by a meter display while a first inter-vehicle distance displaying control is being executed.
Figure 4C:
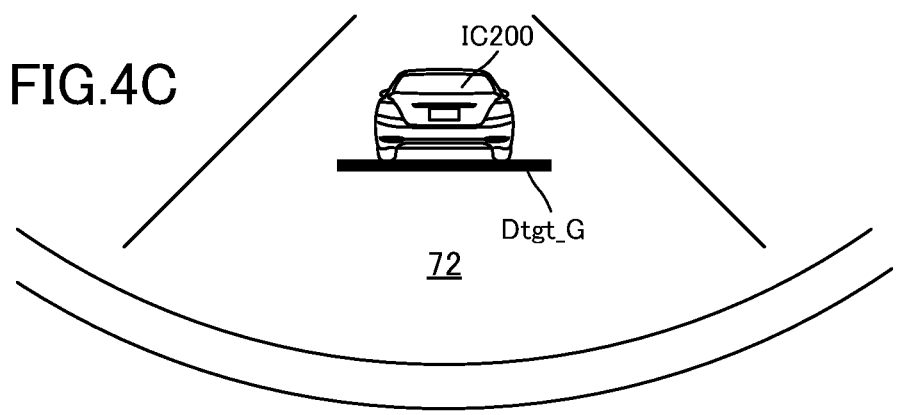
FIG. 4C is a view which shows an enlarged part of the image shown in FIG. 4B.

The first inter-vehicle distance displaying control corresponds to the displaying control. As shown in FIG. 1, the first inter-vehicle distance displaying control corresponds to a control of displaying a target distance line image Dtgt_G by the head-up display 71, and as shown in FIG. 4B and FIG. 4C, displaying the target distance line image Dtgt_G and a preceding vehicle icon IC200 by the meter display 72. It should be noted that FIG. 4C shows an enlarged part of the meter display 72 shown in FIG. 4B.

The target distance line image Dtgt_G corresponds to a line-shaped image which represents the target distance Dtgt. Further, the preceding vehicle icon IC200 corresponds to an image which represents the preceding vehicle 200. While the first inter-vehicle distance displaying control is being executed, the inter-vehicle distance D is controlled at the target distance Dtgt. Therefore, the target distance line image Dtgt_G displayed by the head-up display 71 is displayed in the vicinity of a rear wheel of the preceding vehicle 200, and the target distance line image Dtgt_G displayed by the meter display 72 is displayed in the vicinity of a lower end of the preceding vehicle icon IC200.

On the other hand, when the vehicle control apparatus 10 determines "No" at the step S315, the vehicle control apparatus 10 proceeds with the process to a step S330 to execute a first moving speed control as the autonomous acceleration/deceleration control. The first moving speed control corresponds to the first autonomous acceleration/deceleration control. The first moving speed control corresponds to a control of autonomously controlling the acceleration and deceleration of the own vehicle 100 so as to maintain the own vehicle speed V at the set speed Vset. Therefore, the first moving speed control corresponds to a so-called constant speed moving control or a cruise control.

Next, the vehicle control apparatus 10 proceeds with the process to a step S335 to execute a first moving speed displaying control Then, the vehicle control apparatus 10 proceeds with the process to the step S395 to terminate executing the process of this routine once.

Figure 5A:
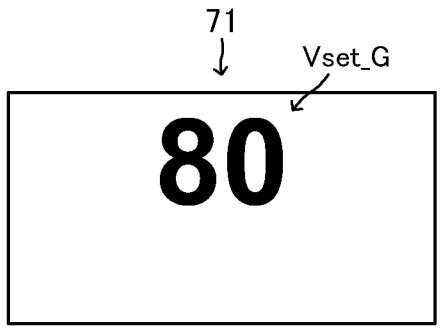
FIG. 5A is a view which shows an image displayed by the head-up display while a first moving speed control is being executed.
Figure 5B:
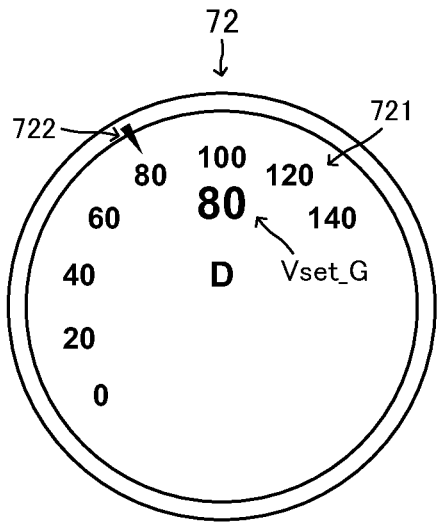
FIG. 5B is a view which shows an image displayed by the meter display while a first moving speed displaying control is being executed.
Figure 5C:
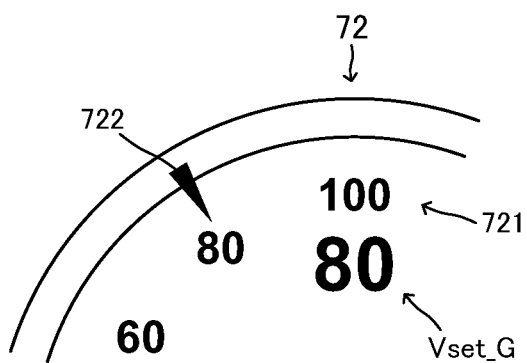
FIG. 5C is a view which shows an enlarged part of the image shown in FIG. 5B.

The first moving speed displaying control corresponds to the displaying control. The first moving speed displaying control corresponds to a control of displaying a set speed image Vset_G by the head-up display 71 as shown in FIG. 5A, and displaying the set speed image Vset_G by the meter display 72 as shown in FIG. 5B and FIG. 5C. The set speed image Vset_G corresponds to an image which represents the set speed Vset. It should be noted that FIG. 5C shows an enlarged part of the meter display 72 shown in FIG. 5B. Further, FIG. 5A to FIG. 5C show the exemplary set speed Vset of 80 kilometers per hour.

Further, when the vehicle control apparatus 10 determines "No" at the step S310, the vehicle control apparatus 10 proceeds with the process to a step S340 to determine whether the preceding vehicle 200 exists. That is, when the second condition C2 is not satisfied at the step S310, and therefore a condition that the execution of the second autonomous acceleration/deceleration control (or the economy moving control) is requested, is satisfied, the vehicle control apparatus 10 proceeds with the process to a step S340 to determine whether the preceding vehicle 200 exists.

When the vehicle control apparatus determines "Yes" at the step S340, the vehicle control apparatus 10 proceeds with the process to a step S345 to execute the second inter-vehicle distance control as the autonomous acceleration/deceleration control.

The second inter-vehicle distance control corresponds to a control of autonomously controlling the acceleration and deceleration of the own vehicle 100 so as to maintain the inter-vehicle distance D at a distance within a predetermined range (i.e., a predetermined distance range RD) by starting executing a coasting control of causing the own vehicle 100 to coast when the inter-vehicle distance D decreases and reaches a lower limit distance Dlower (i.e., a lower limit value of the predetermined distance range RD and starting executing an acceleration control (or an optimum acceleration control) of accelerating the own vehicle 100 when the inter-vehicle distance D increases and reaches an upper limit distance Dupper (i.e., an upper limit value of the predetermined distance range RD). In the present embodiment, the predetermined distance range RD is set to a range which includes the target distance Dtgt.

The optimum acceleration control corresponds to a control of controlling the operation of the driving apparatus 20 such that power is output from the driving apparatus 20 with the highest energy efficiency. In particular, the optimum acceleration control corresponds to a control of operating the internal combustion engine 21 at an optimum operating point (or an operating point near the optimum operating point). Further, the coasting control corresponds to a control of controlling the operation of the driving apparatus 20 such that the own vehicle 100 coasts.

Next, the vehicle control apparatus 10 proceeds with the process to a step S350 to execute a second inter-vehicle distance displaying control. Then, the vehicle control apparatus 10 proceeds with the process to the step S395 to terminate executing the process of this routine once.

The second inter-vehicle distance displaying control corresponds to the displaying control. The second inter-vehicle distance displaying control corresponds to a control of displaying a predetermined distance range image RD_G, the upper limit distance line image Dupper_G, the lower limit distance line image Dlower_G, the own vehicle icon IC100, and the preceding vehicle icon IC200 by the meter display 72 as shown in FIG. 6, and displaying the predetermined distance range image RD_G, the upper limit distance line image Dupper_G, and the lower limit distance line image Dlower_G by the head-up display 71 as shown in FIG. 7.

The predetermined distance range image RD_G corresponds to an image which represents. The predetermined distance range image RD_G is displayed by the meter display 72 such that the own vehicle icon IC100 exists at a position within the predetermined distance range image RD_G. In addition, the predetermined distance range image RD_G is displayed by the head-up display 71 such that the own vehicle 100 exists at a position within the predetermined distance range image RD_G.

An upper outline RDupper of the predetermined distance range image RD_G represents the lower limit distance Dlower, and a lower outline RDlower of the predetermined distance range image RD_G represents the upper limit distance Dupper. Further, a longitudinal length of the predetermined distance range image RD_G (a length from the upper outline line RDupper to the lower outline RDlower) is set to a length corresponding to a width of the predetermined distance range RD. Therefore, when the width of the predetermined distance range RD is changed, the longitudinal length of the predetermined distance range image RD_G is changed depending on the changed width. That is, the longitudinal length of the predetermined distance range image RD_G is changed such that the longitudinal length of the predetermined distance range image RD_G corresponds to the width of the changed predetermined distance range RD.

Further, the upper outline RDupper of the predetermined distance range image RD_G displayed by the head-up display 71 is displayed so as to indicate a position which is separated rearwardly from the preceding vehicle 200 by the lower limit distance Dlower, and the lower outline RDlower of the predetermined distance range image RD_G is displayed so as to indicate a position which is separated rearwardly from the preceding vehicle 200 by the upper limit distance Dupper.

Figure 7A:
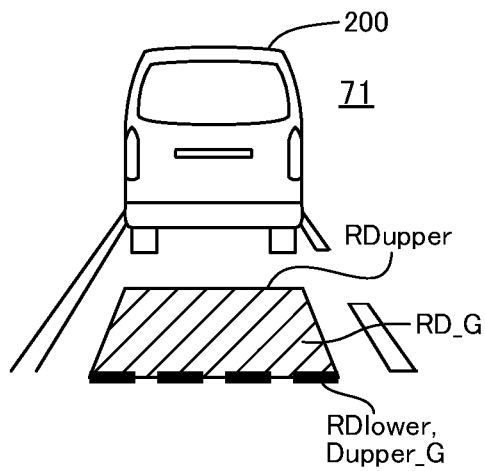
FIG. 7A is a view which shows an image displayed by the head-up display while the coasting control of the second inter-vehicle distance control is being executed.

It should be noted that when the predetermined distance range image RD_G having a length corresponding to the width of the predetermined distance range RD is displayed by the head-up display 71, a lower part of the predetermined distance range image RD_G may not be displayed as shown in FIG. 7A. In this case, the lower outline RDlower of the predetermined distance range image RD_G is displayed by the head-up display 71, but does not display the upper limit distance Dupper.

The upper limit distance line image Dupper_G corresponds to an image which represents the upper limit distance Dupper. The upper limit distance line image Dupper is displayed on the lower outline RDlower of the predetermined distance range image RD_G. The lower limit distance line image Dlower_G corresponds to an image which represents the lower limit distance Dlower. The lower limit distance line image Dlower_G is displayed on the upper outline RDupper of the predetermined distance range image RD_G. However, as shown in FIG. 7A, when a lower part of the predetermined distance range image RD_G cannot be displayed by the head-up display 71, the lower outline RDlower of the predetermined distance range image RD_G does not represent the upper limit distance Dupper. Therefore, in the present embodiment, the upper limit distance line image Dupper_G is displayed on the lower outline RDlower of the predetermined distance range image RD_G, but is displayed by a chain line image instead of a solid line image.

It should be noted that the upper limit distance line image Dupper_G is displayed as an image of a solid line thicker than the lower outline RDlower of the predetermined distance range image RD_G, and the lower limit distance line image Dlower_G is displayed as an image of a solid line thicker than the upper outline RDupper of the predetermined distance range image RD_G.

In addition, the own vehicle icon IC100 corresponds to an image which represents the own vehicle 100. The own vehicle icon IC100 is displayed so as to overlap the predetermined distance range image RD_G. Therefore, the predetermined distance range image RD_G is displayed by the meter display 72 such that the own vehicle icon IC100 exists at a position within the predetermined distance range image RD_G. Further, the preceding vehicle icon IC200 corresponds to an image which represents the preceding vehicle 200. The preceding vehicle icon IC200 is displayed on an upper side of the own vehicle icon IC100 in the meter display 72.

Figure 6A:
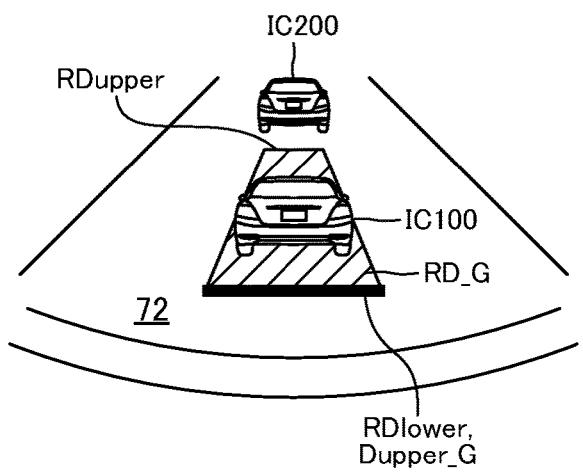
FIG. 6A is a view which shows an image displayed by the meter display while a coasting control of a second inter-vehicle distance control is being executed.
Figure 6B:
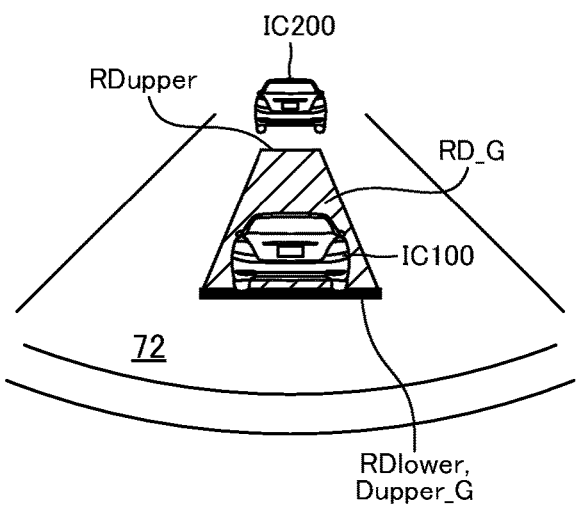
FIG. 6B is a view which shows an image displayed by the meter display when an inter-vehicle distance reaches an upper limit distance while the coasting control of the second inter-vehicle distance control is being executed.

While the coasting control of the second inter-vehicle distance control is being executed, the vehicle control apparatus 10 displays the predetermined distance range image RD_G, the upper limit distance line image Dupper_G, the own vehicle icon IC100, and the preceding vehicle icon IC200 on the meter display 72 by the second inter-vehicle distance displaying control as shown in FIG. 6A. When the inter-vehicle distance D reaches the upper limit distance Dupper, the vehicle control apparatus 10 displays the predetermined distance range image RD_G, the upper limit distance line image Dupper_G, the own vehicle icon IC100, and the preceding vehicle icon IC200 on the meter display 72 as shown in FIG. 6B.

While the coasting control of the second inter-vehicle distance control is being executed, the position of the own vehicle icon IC100 remains fixed in the meter display 72. On the other hand, as the inter-vehicle distance D increases, the predetermined distance range image RD_G is moved upward in the meter display 72 such that its lower outline RDlower approaches the own vehicle icon IC100, and accordingly, the upper limit distance line image Dupper_G is also moved upward in the meter display 72 so as to approach the own vehicle icon IC100 while keeping a state that the upper limit distance line image Duuper_G is displayed on the lower outline of the predetermined distance range image RD_G. When the inter-vehicle distance D reaches the upper limit distance Dupper, the lower outline RDlower and the upper limit distance line image Dupper_G of the predetermined distance range image RD_G are displayed near a lower end of the own vehicle icon IC100 as shown in FIG. 6B.

Figure 6C:
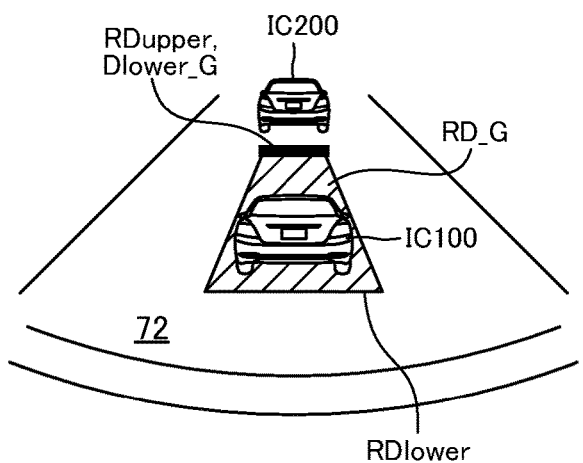
FIG. 6C is a view which shows an image displayed by the meter display while an optimum acceleration control of the second inter-vehicle distance control is being executed.
Figure 6D:
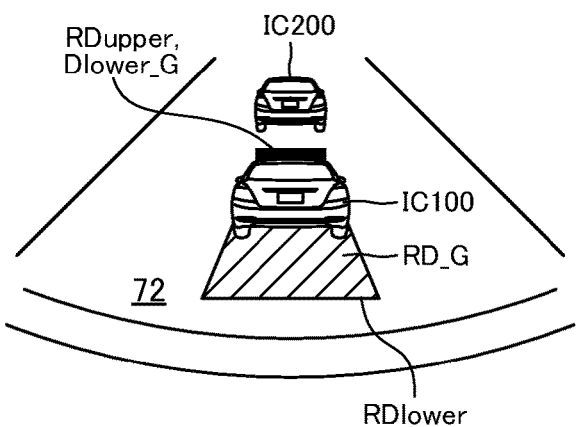
FIG. 6D is a view which shows an image displayed by the meter display when the inter-vehicle distance reaches a lower limit distance while the optimum acceleration control of the second inter-vehicle distance control is being executed.

On the other hand, while the optimum acceleration control of the second inter-vehicle distance control is being executed, the vehicle control apparatus 10 executes the second inter-vehicle distance displaying control to display the predetermined distance range image RD_G, the lower limit distance line image Dlower_G, the own vehicle icon IC100, and the preceding vehicle icon IC200 on the meter display 72 as shown in FIG. 6C. When the inter-vehicle distance D reaches the lower limit distance Dlower while the optimum acceleration control of the second inter-vehicle distance control is being executed, the vehicle control apparatus 10 executes the second inter-vehicle distance displaying control to display the predetermined distance range image RD_G, the lower limit distance line image Dlower_G, the own vehicle icon IC100, and the preceding vehicle icon IC200 on the meter display 72 by the second inter-vehicle distance displaying control as shown in FIG. 6D.

While the optimum acceleration control of the second inter-vehicle distance control is being executed, the position of the own vehicle icon IC100 remains fixed on the meter display 72, but the predetermined distance range image RD_G is moved downward in the meter display 72 such that as the inter-vehicle distance D decreases, the upper outline RDupper of the predetermined distance range image RD_G approaches the own vehicle icon IC100, and accordingly, the lower limit distance line image Dlower_G is also moved downward in the meter display 72 so as to approach the own vehicle icon IC100 while maintaining a state that the lower limit distance line image Dlower_G is displayed on the upper outline RDupper of the predetermined distance range image RD_G. When the inter-vehicle distance D reaches the lower limit distance Dlower, the upper outline RDupper and the lower limit distance line image Dlower_G of the predetermined distance range image RD_G are displayed near an upper end of the own vehicle icon IC100 as shown in FIG. 6D.

Figure 7B:
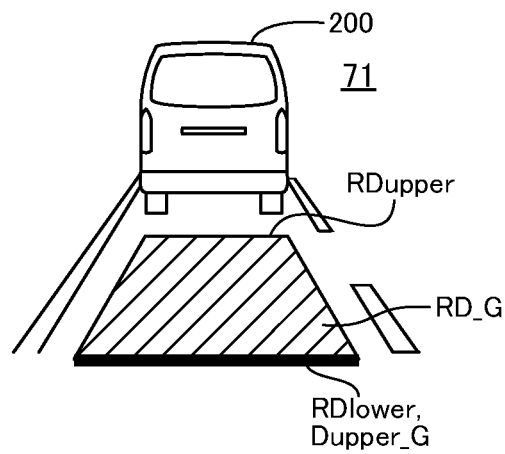
FIG. 7B is a view which shows an image displayed by the head-up display when the inter-vehicle distance reaches the upper limit distance while the coasting control of the second inter-vehicle distance control is being executed.

Further, while the coasting control of the second inter-vehicle distance control is being executed, the vehicle control apparatus 10 executes the second inter-vehicle distance displaying control to display the predetermined distance range image RD_G and the upper limit distance line image Dupper_G on the head-up display 71 as shown in FIG. 7A. When the inter-vehicle distance D reaches the upper limit distance Dupper while the coasting control of the second inter-vehicle distance control is being executed, the vehicle control apparatus 10 executes the second inter-vehicle distance displaying control to display the predetermined distance range image RD_G and the upper limit distance line image Dupper_G on the head-up display 71 as shown in FIG. 7B.

While the coasting control of the second inter-vehicle distance control is being executed, the inter-vehicle distance D increases. Thus, the own vehicle 100 moves away from the preceding vehicle 200. Therefore, as the inter-vehicle distance D increases, the predetermined distance range image RD_G displayed by the head-up display 71 is moved upward such that the upper outline RDupper continues to indicate a position separated from the preceding vehicle 200 by the lower limit distance Dlower, and accordingly, in an example shown in FIG. 7A, a displaying area of the predetermined distance range image RD_G gradually increases. When the inter-vehicle distance D reaches the upper limit distance Dupper, the lower outline RDlower of the predetermined distance range image RD_G indicating the upper limit distance Dupper is displayed on the head-up display 71 as shown in FIG. 7B. Thus, the upper limit distance line image Dupper_G is displayed by a solid line image on the lower outline RDlower thereof.

Figure 7C:
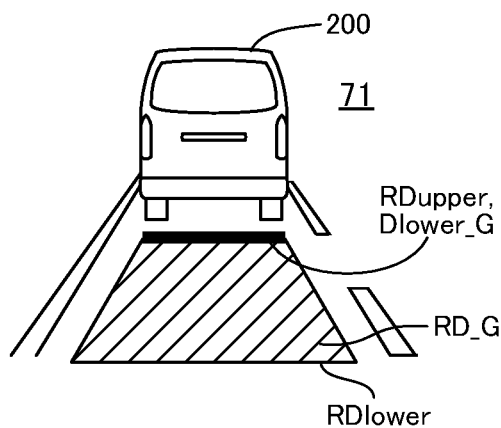
FIG. 7C is a view which shows an image displayed by the head-up display while the optimum acceleration control of the second inter-vehicle distance control is being executed.
Figure 7D:
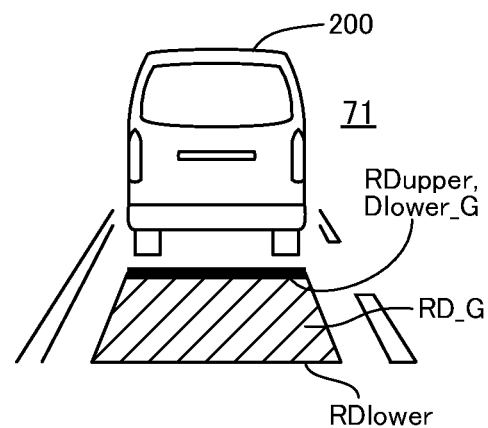
FIG. 7D is a view which shows an image displayed by the head-up display when the vehicle-to-vehicle distance reaches the lower limit distance while the optimum acceleration control of the second inter-vehicle distance control is being executed.

On the other hand, while the optimum acceleration control of the second inter-vehicle distance control is being executed, the vehicle control apparatus 10 executes the second inter-vehicle distance displaying control to display the predetermined distance range image RD_G and the lower limit distance line image Dlower_G on the head-up display 71 as shown in FIG. 7C. When the inter-vehicle distance D reaches the lower limit distance Dlower while the optimum acceleration control of the second inter-vehicle distance control is being executed, the vehicle control apparatus 10 executes the second inter-vehicle distance displaying control to display the predetermined distance range image RD_G and the lower limit distance line image Dlower_G on the head-up display 71 as shown in FIG. 7D.

While the optimum acceleration control of the second inter-vehicle distance control is being executed, the inter-vehicle distance D decreases. Thus, the own vehicle 100 approaches the preceding vehicle 200. Therefore, the predetermined distance range image RD_G displayed by the head-up display 71 is moved downward such that the upper outline RDupper of the predetermined distance range image RD_G continues to indicate a position separated from the preceding vehicle 200 by the lower limit distance Dlower as the inter-vehicle distance D decreases and accordingly in an example shown in FIG. 7C, the displaying area of the predetermined distance range image RD_G gradually decreases. Further, as the predetermined distance range image RD_G is moved downward, the lower limit distance line image Dlower_G is also moved downward while keeping a state that the lower limit distance line image Dlower_G is displayed on the upper outline RDupper of the predetermined distance range image RD_G. When the inter-vehicle distance D reaches the lower limit distance Dlower, the predetermined distance range image RD_G and the lower limit distance line image Dlower_G are displayed as shown in FIG. 7D.

On the other hand, when the vehicle control apparatus 10 determines "No" at the step S340, the vehicle control apparatus 10 proceeds with the process to a step S355 to execute the second moving speed control.

The second moving speed control corresponds to a control of autonomously controlling the acceleration and deceleration of the own vehicle 100 so as to maintain the own vehicle speed V at a speed within a predetermined range (or a predetermined speed range RV) by starting to execute the coasting control when the own vehicle speed V increases and reaches an upper limit value (or an upper limit speed Vupper) of the predetermined speed range RV and starting to execute the optimum acceleration control when the own vehicle speed V decreases and reaches a lower limit value (or a lower limit speed Vlower) of the predetermined speed range RV. In the present embodiment, the predetermined speed range RV is set to a range which includes the set speed Vset.

Next, the vehicle control apparatus 10 proceeds with the process to a step S360 to execute a second moving speed displaying control. Then, the vehicle control apparatus 10 proceeds with the process to the step S395 to terminate executing the process of this routine once.

The second moving speed displaying control corresponds to the displaying control. The second moving speed displaying control corresponds to a control of (i) displaying a predetermined speed range image RV_G, the upper limit speed line image Vupper_G, the lower limit speed line image Vlower_G, and the own vehicle icon IC100 by the meter display 72 as shown in FIG. 8 and (ii) displaying the predetermined speed range image RV_G, the upper limit speed line image Vupper_G, and the lower limit speed line image Vlower_G by the head-up display 71 as shown in FIG. 9.

The predetermined speed range image RV_G corresponds to an image which represents the predetermined speed range RV. The meter display 72 displays the own vehicle icon IC100 so as to exist at a position within the predetermined speed range image RV_G, and the head-up display 71 displays the own vehicle 100 so as to exist at a position within the predetermined speed range image RV_G.

The upper outline RVupper of the predetermined speed range image RV_G represents the upper limit speed Vupper, and the lower outline RVlower of the predetermined speed range image RV_G represents the lower limit speed Vlower. Further, a longitudinal length of the predetermined speed range images RV_G (i.e., a length from the upper outline RVupper to the lower outline RVlower) is set to a length which corresponds to a width of the predetermined speed range RV. Therefore, when the width of the predetermined speed range RV is changed, the longitudinal length of the predetermined speed range images RV_G is changed depending on the changed width. That is, the longitudinal length of the predetermined speed range image RV_G is changed such that the longitudinal length of the predetermined speed range image RV_G corresponds to the changed width of the predetermined speed range RV.

Figure 9A:
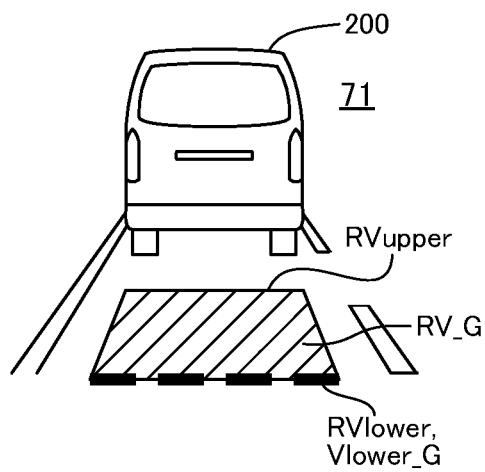
FIG. 9A is a view which shows an image displayed by the head-up display while the coasting control of the second moving speed control is being executed.

It should be noted that when the predetermined speed range image RV_G having the length corresponding to the width of the predetermined speed range RV is to be displayed by the head-up display 71, a lower part of the predetermined speed range image RV_G may not be displayed by the head-up display 71 as shown in FIG. 9A. In this case, the lower outline RVlower of the predetermined speed range image RV_G is displayed by the head-up display 71, but does not represent the lower limit speed Vlower.

Further, the upper limit speed line image Vupper_G is an image which represents the upper limit speed Vupper. The upper limit speed line image Vupper_G is displayed on the upper outline line RVupper of the predetermined speed range image RV_G. Furthermore, the lower limit speed line image Vlower_G is an image which represents the lower limit speed Vlower. The lower limit speed line image Vlower_G is displayed on the lower outline RVlower of the predetermined speed range image RV_G. In this regard, as shown in FIG. 9A, when the lower part of the predetermined speed range image RV_G cannot be displayed by the head-up display 71, the lower outline RVlower of the predetermined speed range image RV_G does not represent the lower limit speed Vlower. Therefore, in the present embodiment, the lower limit speed line image Vlower_G is displayed on the lower outline RVlower of the predetermined speed range image RV_G, but is displayed by a chain line image instead of a solid line image.

It should be noted that the upper limit speed line image Vupper_G is displayed as an image of a solid line thicker than the upper outline RVupper of the predetermined speed range image RV_G, and the lower limit speed line image Vlower_G is displayed as an image of a solid line thicker than the lower outline RVlower of the predetermined speed range image RV_G.

In addition, the own vehicle icon IC100 corresponds to an image which represents the own vehicle 100. The own vehicle icon IC100 is displayed so as to overlap the predetermined velocity range image RV_G. Therefore, the predetermined speed range image RV_G is displayed on the meter display 72 such that the own vehicle icon IC100 exists at a position within the predetermined speed range image RV_G.

Figure 8A:
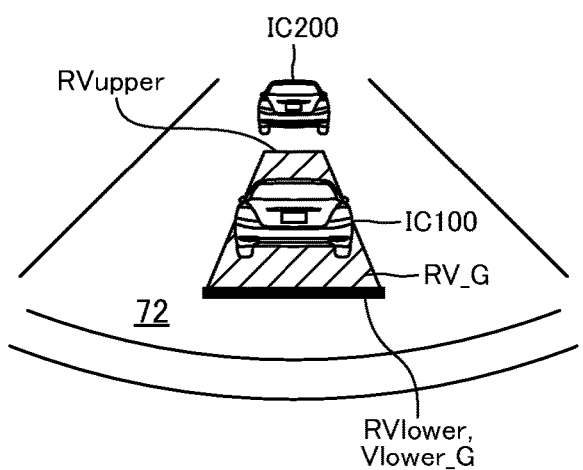
FIG. 8A is a view which shows an image displayed by the meter display while a coasting control of a second moving speed control is being executed.
Figure 8B:
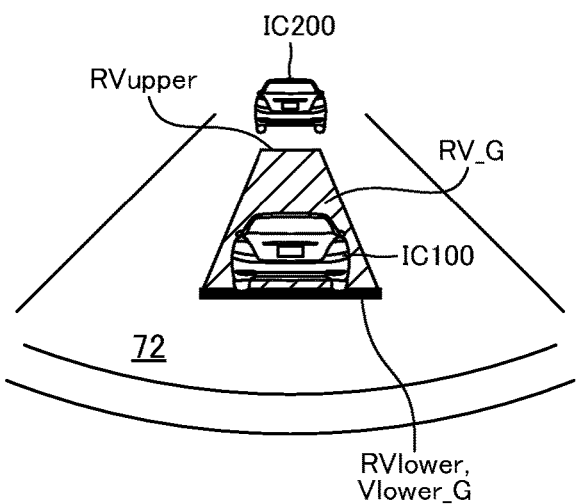
FIG. 8B is a view which shows an image displayed by the meter display when an own vehicle speed reaches a lower limit speed while the coasting control of the second moving speed control is being executed.

While the coasting control of the second moving speed control is being executed, the vehicle control apparatus 10 executes the second moving speed displaying control to display the predetermined speed range image RV_G, the lower limit speed line image Vlower_G, and the own vehicle icon IC100 on the meter display 72 as shown in FIG. 8A. When the own vehicle speed V reaches the lower limit speed Vlower, the vehicle control apparatus 10 executes the second moving speed displaying control to display the predetermined speed range image RV_G, the lower limit speed line image Vlower_G, and the own vehicle icon IC100 on the meter display 72 as shown in FIG. 8B.

While the coasting control of the second moving speed control is being executed, the position of the own vehicle icon IC100 remains fixed in the meter display 72, but the predetermined speed range image RV_G is moved upward in the meter display 72 such that as the own vehicle speed V decreases, the lower outline RVlower approaches the own vehicle icon IC100, and accordingly, the lower limit speed line image Vlower_G is also moved upward in the meter display 72 so as to approach the own vehicle icon IC100 while keeping a state that the lower limit speed line image Vlower_G is displayed on the lower outline RVlower of the predetermined speed range image RV_G. When the own vehicle speed V reaches the lower limit speed Vlower, the lower outline RVlower and the lower limit speed line image Vlower_G of the predetermined speed range image RV_G are displayed near the lower end of the own vehicle icon IC100 as shown in FIG. 8B.

Figure 8C:
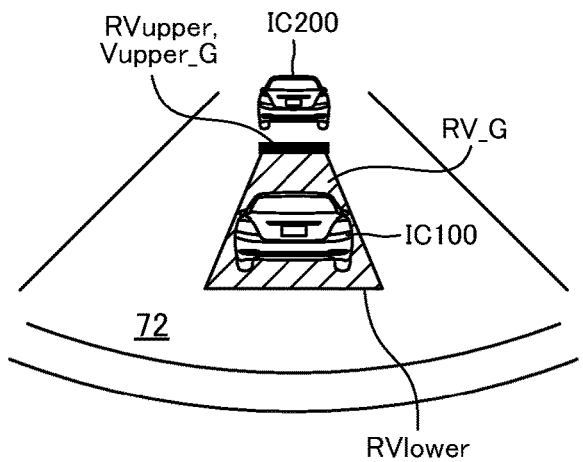
FIG. 8C is a view which shows is an image displayed by the meter display while an optimum acceleration control of the second moving speed control is being executed.
Figure 8D:
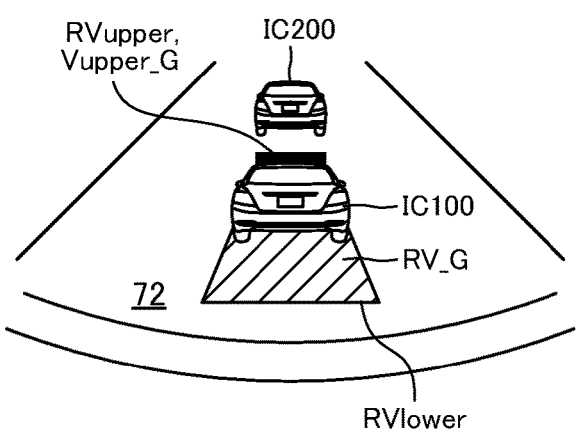
FIG. 8D is a view which shows an image displayed by the meter display when the own vehicle speed reaches an upper limit speed while the optimum acceleration control of the second moving speed control is being executed.

On the other hand, while the optimum acceleration control of the second moving speed control is being executed, the vehicle control apparatus 10 executes the second moving speed displaying control to display the predetermined speed range image RV_G, the upper limit speed line image Vupper_G, and the own vehicle icon IC100 on the meter display 72 as shown in FIG. 8C. When the own vehicle speed V reaches the upper limit speed Vupper while the optimum acceleration control of the second moving speed control is being executed, the vehicle control apparatus 10 executes the second moving speed displaying control to display the predetermined speed range image RV_G, the upper limit speed line image Vupper_G, and the own vehicle icon IC100 on the meter display 72 as shown in FIG. 8D.

While the optimum acceleration control of the second moving speed control is being executed, the position of the own vehicle icon IC100 remains fixed in the meter display 72, but the predetermined speed range image RV_G is moved downward in the meter display 72 such that the upper outline RVupper of the predetermined speed range image RV_G approaches the own vehicle icon IC100 as the own vehicle speed V increases, and accordingly, the upper limit speed line image Vupper_G is also moved downward in the meter display 72 so as to approach the own vehicle icon IC100 while keeping a state that the upper limit speed line image Vupper_G is displayed on the upper outline RVupper of the predetermined speed range image RV_G. When the own vehicle speed V reaches the upper limit speed Vupper, the upper outline RVupper and the upper limit speed line image Vupper_G of the predetermined speed range image RV_G are displayed in the vicinity of the upper end of the own vehicle icon IC100 as shown in FIG. 8D.

Figure 9B:
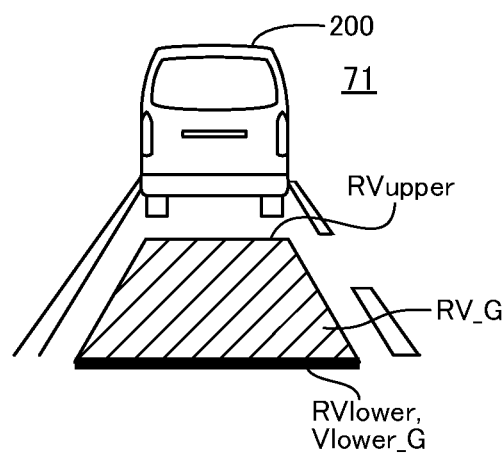
FIG. 9B is a view which shows an image displayed by the head-up display when the own vehicle speed reaches the lower limit speed while the coasting control of the second moving speed control is being executed.

Further, while the coasting control of the second moving speed control is being executed, the vehicle control apparatus 10 executes the second moving speed displaying control to display the predetermined speed range image RV_G and the lower limit speed line image Vlower_G on the head-up display 71 as shown in FIG. 9A. When the own vehicle speed V reaches the lower limit speed Vlower while the coasting control of the second moving speed control is being executed, the vehicle control apparatus 10 executes the second moving speed displaying control to display the predetermined speed range image RV_G and the lower limit speed line image Vlower_G on the head-up display 71 as shown in FIG. 9B.

While the coasting control of the second moving speed control is being executed, the own vehicle speed V decreases. Therefore, the predetermined speed range image RV_G displayed by the head-up display 71 is moved upward as the own vehicle speed V decreases, and accordingly, in an example shown in FIG. 9A, the displaying area of the predetermined speed range image RV_G gradually increases. When the own vehicle speed V reaches the lower limit speed Vlower, the lower outline RVlower of the predetermined speed range image RV_G representing the lower limit speed Vlower is displayed on the head-up display 71 as shown in FIG. 9B. Thus, the lower limit speed line image Vlower_G is displayed on the lower outline RVlower as an image of a solid line.

Figure 9C:
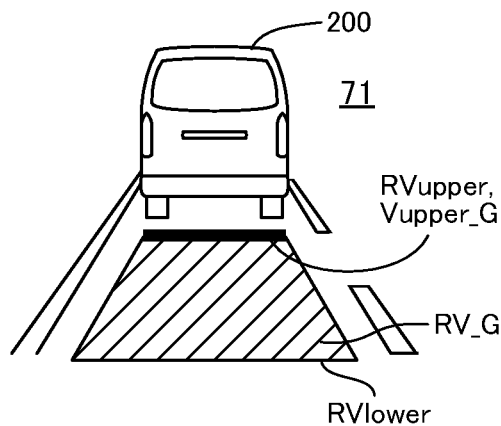
FIG. 9C is a view which shows an image displayed by the head-up display while the optimum acceleration control of the second moving speed control is being executed.
Figure 9D:
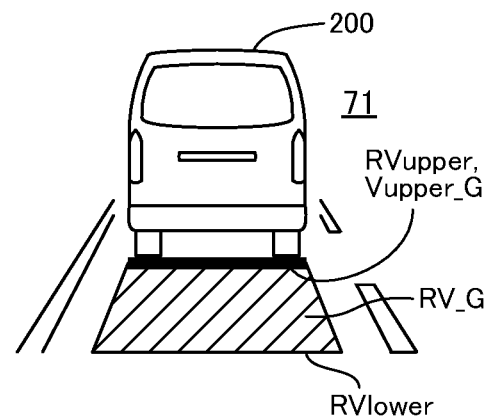
FIG. 9D is a view which shows an image displayed by the head-up display when the own vehicle speed reaches the upper limit speed while the optimum acceleration control of the second moving speed control is being executed.

On the other hand, while the optimum acceleration control of the second moving speed control is being executed, the vehicle control apparatus 10 executes the second moving speed displaying control to display the predetermined speed range image RV_G and the upper limit speed line image Vupper_G on the head-up display 71 as shown in FIG. 9C. When the own vehicle speed V reaches the upper limit speed Vupper, as shown in FIG. 9D while the optimum acceleration control of the second moving speed control is being executed, the vehicle control apparatus 10 executes the second moving speed displaying control to display the predetermined speed range image RV_G and the upper limit speed line image Vupper_G on the head-up display 71.

While the optimum acceleration control of the second moving speed control is being executed, the own vehicle speed V increases. Therefore, the predetermined speed range image RV_G displayed by the head-up display 71 is moved downward as the own vehicle speed V increases, and accordingly, in an example shown in FIG. 9C, the displaying area of the predetermined speed range image RV_G gradually decreases. Further, as the predetermined speed range image RV_G is moved downward, the upper limit speed line image Vupper_G is also moved downward while keeping a state that the upper limit speed line image Vupper_G is displayed on the upper outline RVupper of the predetermined speed range image RV_G. When the own vehicle speed V reaches the upper limit speed Vupper, the predetermined speed range image RV_G and the upper limit speed line image Vupper_G are displayed as shown in FIG. 9D.

In addition, when the vehicle control apparatus determines "No" at the step S305, the vehicle control apparatus 10 proceeds with the process directly to the step S395 to terminate executing the process of this routine once. At this time, when the autonomous acceleration/deceleration control is being executed, the execution of the autonomous acceleration/deceleration control is terminated.

The operation of the vehicle control apparatus 10 has been described.

Advantages

While the second moving speed control is being executed, the own vehicle speed V increases or decreases considerably within the predetermined speed range RV. Further, while the second inter-vehicle distance control is being executed, the inter-vehicle distance D increases or decreases considerably within the predetermined distance range RD. When the own vehicle speed V or the inter-vehicle distance D increases or decreases considerably, the operator of the own vehicle 100 may erroneously understand that the own vehicle speed V or the inter-vehicle distance D is not normally controlled.

With the vehicle control apparatus 10, while the second moving speed control is being executed, the predetermined speed range RV corresponding to the control target of the second moving speed control, is displayed such that the own vehicle 100 or the own vehicle icon IC100 exists at a position within the predetermined speed range image RV_G. Further, with the vehicle control apparatus 10, while the second inter-vehicle distance control is being executed, the predetermined distance range RD corresponding to the control target of the second inter-vehicle distance control, is displayed such that the own vehicle 100 or the own vehicle icon IC100 exists at a position within the predetermined distance range image RD_G. Thus, the operator of the own vehicle 100 can easily recognize that the own vehicle speed V or the inter-vehicle distance D is controlled within a certain range of a certain width. Therefore, the vehicle control apparatus 10 can prevent the operator of the own vehicle 100 from erroneously understand that the own vehicle speed V or the inter-vehicle distance D is not normally controlled.

It should be noted that the present invention is not limited to the above-described embodiments, and various modifications can be adopted within the scope of the present invention.

For example, when a following vehicle 300 exists as shown in FIG. 2B, the vehicle control apparatus 10 may be configured to accelerate the own vehicle 100 by the optimum acceleration control when a following inter-vehicle distance DR (i.e., a distance between the own vehicle 100 and the following vehicle 300) becomes equal to or smaller than a predetermined distance even when the inter-vehicle distance D is smaller than the upper limit distance Dupper while the second inter-vehicle distance control is being executed. In this case, the vehicle control apparatus 10 starts to execute the optimum acceleration control and continues executing the optimum acceleration control until the inter-vehicle distance D reaches the lower limit distance Dlower even if the following inter-vehicle distance DR becomes greater than the predetermined distance.

In addition, when the following vehicle 300 exists, the vehicle control apparatus 10 may be configured to determine a point of time of starting to execute the optimum acceleration control such that the own vehicle 100 does not approach the following vehicle 300 too closely in view of a difference between the own vehicle speed V and a moving speed of the following vehicle 300 while the second inter-vehicle distance control is being executed.

Further, the vehicle control apparatus 10 displays the predetermined distance range image RD_G, the predetermined speed range image RV_G, and the like by both the head-up display 71 and the meter display 72 while the autonomous acceleration/deceleration control is being executed. In this regard, the vehicle control apparatus 10 may be configured to display the predetermined distance range image RD_G, the predetermined speed range image RV_G, and the like by either the head-up display 71 or the meter display 72.

Further, the autonomous acceleration/deceleration control described above corresponds to a control of controlling the acceleration and deceleration of the own vehicle 100 with respect to the preceding vehicle 200. In this regard, the autonomous acceleration/deceleration control may correspond to a control of controlling the acceleration and deceleration of the own vehicle 100 with respect to a surrounding vehicle (i.e., another vehicle around the own vehicle 100 including the following vehicle 300 and moving in the same direction as a moving direction of the own vehicle 100.

What is claimed is:

1. A displaying control apparatus, comprising an electronic control unit configured to:
   display an image which represents a predetermined speed range by a displaying device of an own vehicle while the electronic control unit is executing a moving speed control,
   the moving speed control corresponding to a control of (i) executing a coasting control of causing the own vehicle to coast when a moving speed of the own vehicle increases and reaches an upper limit value of the predetermined speed range, and (ii) executing an acceleration control of accelerating the own vehicle when the moving speed of the own vehicle decreases and reaches a lower limit value of the predetermined speed range; or
   display an image which represents a predetermined distance range by the displaying device while the electronic control unit is executing an inter-vehicle distance control,
   the inter-vehicle distance control corresponding to a control of (i) executing the coasting control when an inter-vehicle distance between the own vehicle and a surrounding vehicle decreases and reaches a lower limit value of the predetermined distance range, and (ii) executing the acceleration control when the inter-vehicle distance increases and reaches an upper limit value of the predetermined distance range, the surrounding vehicle corresponding to a vehicle around the own vehicle and moving in the same direction in which the own vehicle moves, wherein the electronic control unit is configured to:

while the electronic control unit is executing the moving speed control, display the image representing the predetermined speed range such that the own vehicle or an image representing the own vehicle is displayed within the image representing the predetermined speed range; and while the electronic control unit is executing the inter-vehicle distance control, display the image representing the predetermined distance range such that the own vehicle or the image representing the own vehicle is displayed within the image representing the predetermined distance range.

2. The displaying control apparatus as claimed in claim 1, wherein the electronic control unit is configured to:

when the electronic control unit changes a width of the predetermined speed range, change a length of the image representing the predetermined speed range depending on the changed width of the predetermined speed range; and when the electronic control unit changes a width of the predetermined distance range, change a length of the image representing the predetermined distance range depending on the changed width of the predetermined distance range.

* * * * *